(12) United States Patent
Kannan et al.

(10) Patent No.: US 10,816,079 B2
(45) Date of Patent: Oct. 27, 2020

(54) ACTUATOR WITH STACKED GEARS AND BEND SHAFT

(71) Applicant: Johnson Controls Technology Company, Auburn Hills, MI (US)

(72) Inventors: Madan Kumar Kamala Kannan, Bangalore (IN); Ujjain Kumar Bidila, Telangana (IN); Umamaheshwararao Karukola, Andhrapradesh (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 122 days.

(21) Appl. No.: 15/899,188

(22) Filed: Feb. 19, 2018

(65) Prior Publication Data

US 2019/0257402 A1  Aug. 22, 2019

(51) Int. Cl.
*F16H 1/20* (2006.01)
*F16H 57/02* (2012.01)
(Continued)

(52) U.S. Cl.
CPC .......... *F16H 57/0031* (2013.01); *F16C 3/02* (2013.01); *F16C 3/18* (2013.01); *F16H 1/20* (2013.01);
(Continued)

(58) Field of Classification Search
CPC ... F16H 1/006; F16H 1/06; F16H 1/22; F16H 1/26; F16H 3/087; F16H 3/091;
(Continued)

(56) References Cited

U.S. PATENT DOCUMENTS 930,431 A * 8/1909 Stewart ................... F16H 1/006
74/385
1,722,723 A * 7/1929 Walker .................. B60B 29/003
81/177.6
(Continued)

FOREIGN PATENT DOCUMENTS

CN 2287233 Y 8/1998
CN 201074636 Y 6/2008
(Continued)

OTHER PUBLICATIONS

U.S. Appl. No. 62/233,919, filed Jul. 18, 2017, Johnson Controls Technology Company.
(Continued)

*Primary Examiner* — Adam D Rogers
(74) *Attorney, Agent, or Firm* — Foley & Lardner LLP

(57) ABSTRACT

A gear train is contained within the housing of an actuator, is coupled to a movable component outside the housing, and includes a first gear and a second gear. A bend shaft is fixed to an internal surface of the housing and supports the first and second gears. The bend shaft includes a lower portion, a crosspiece, and an upper portion. The lower portion has a first end coupled to the housing and a second end offset from the first end, and extends from the first end to the second end along a first direction. The crosspiece is oriented orthogonal to the first direction and extends from the second end of the lower portion. The upper portion has a third end coupled to the crosspiece and a fourth end offset from the third end, and extends from the third end to the fourth end along the first direction.

20 Claims, 12 Drawing Sheets

(51) Int. Cl.
*F16C 3/02* (2006.01)
*F16H 57/00* (2012.01)
*F16H 19/00* (2006.01)
*F16H 57/021* (2012.01)
*F16H 57/023* (2012.01)
*F16K 5/08* (2006.01)
*F16C 3/18* (2006.01)

(52) U.S. Cl.
CPC ......... *F16H 19/001* (2013.01); *F16H 57/021* (2013.01); *F16H 57/023* (2013.01); *F16K 5/08* (2013.01)

(58) Field of Classification Search
CPC ............... F16H 19/001; F16H 57/0031; F16H 57/0037; F16H 57/021; F16H 57/023; F16H 1/20; F16C 3/02; F16C 3/18; F16K 5/08; F16K 31/043
See application file for complete search history.

(56) References Cited

U.S. PATENT DOCUMENTS

| | | | | |
|---|---|---|---|---|
| 1,798,163 | A | * | 3/1931 | Krenzke ................. B66F 13/00 403/95 |
| 8,733,735 | B2 | | 5/2014 | Strebe |
| 2012/0223625 | A1 | | 9/2012 | Klemm et al. |
| 2019/0024819 | A1 | * | 1/2019 | Awasthi ................. F16K 31/44 |

FOREIGN PATENT DOCUMENTS

| | | | | |
|---|---|---|---|---|
| CN | 205915024 | U | | 2/2017 |
| CN | 108194478 | A | * | 6/2018 |
| DE | 4317218 | C1 | * | 6/1994 ............... F16D 3/18 |

OTHER PUBLICATIONS

EP Search Report for Application No. 19157918.4, dated Jun. 17, 2019, 11 pages.

* cited by examiner

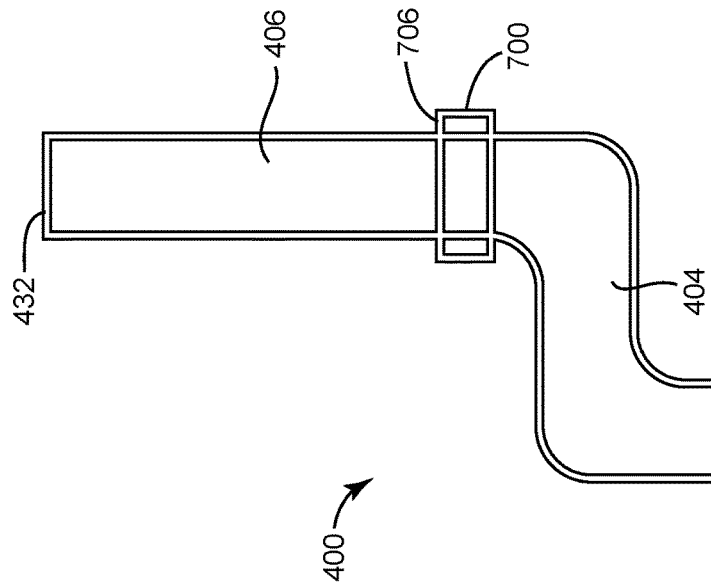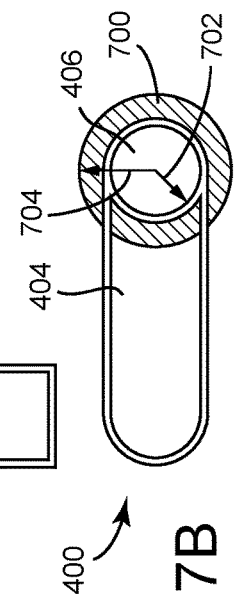
FIG. 7A
FIG. 7B
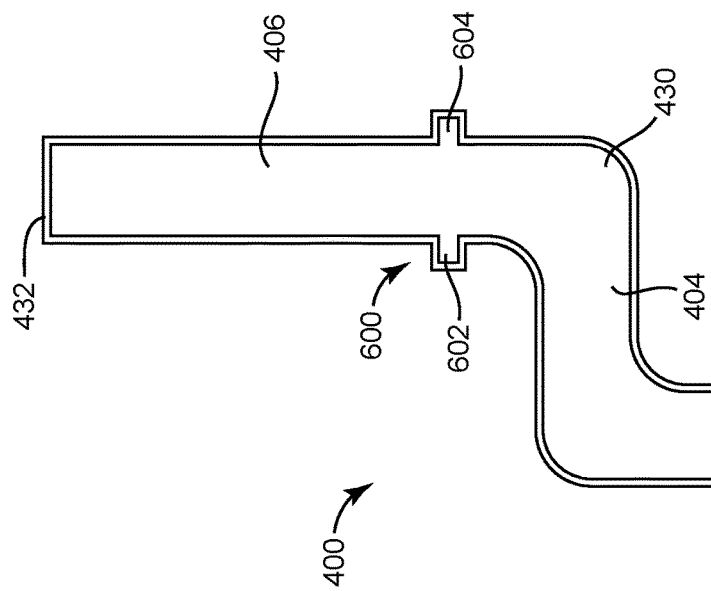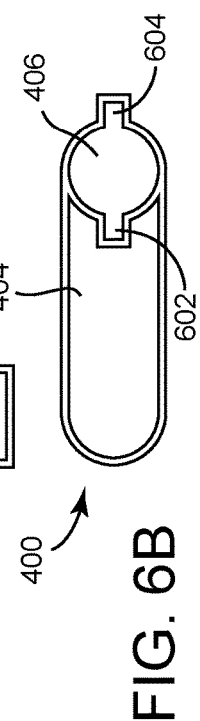
FIG. 6A
FIG. 6B

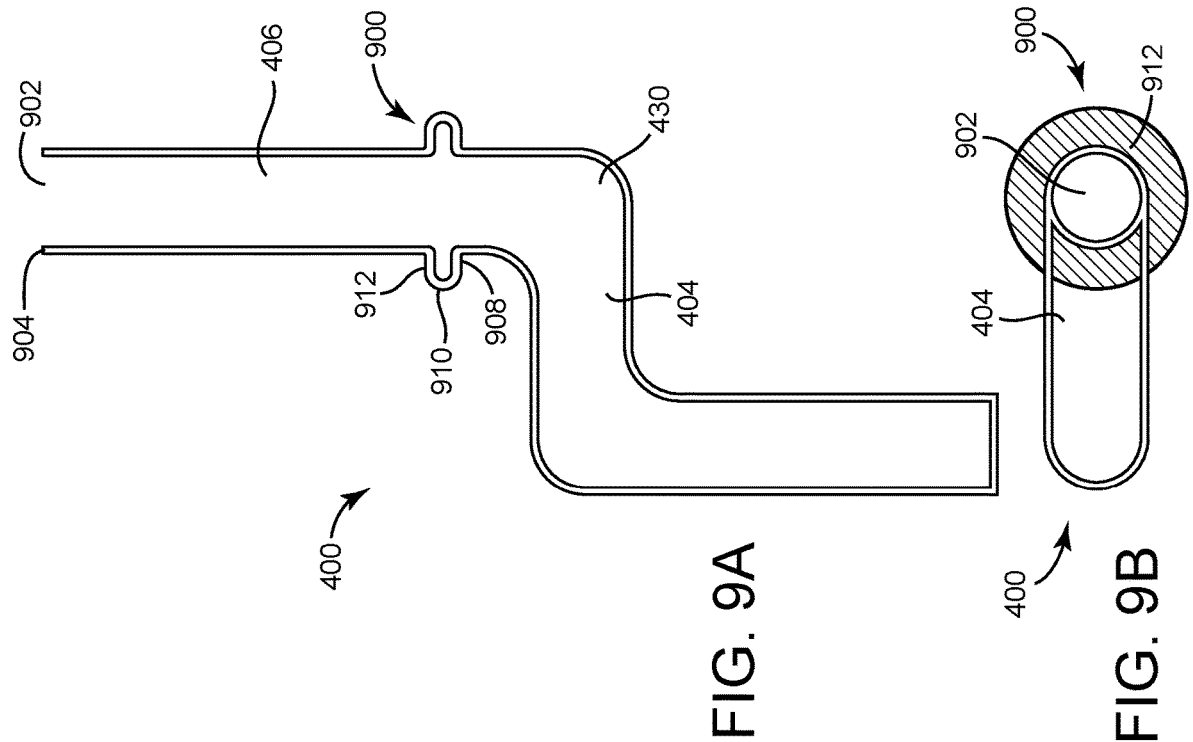
FIG. 9A
FIG. 9B
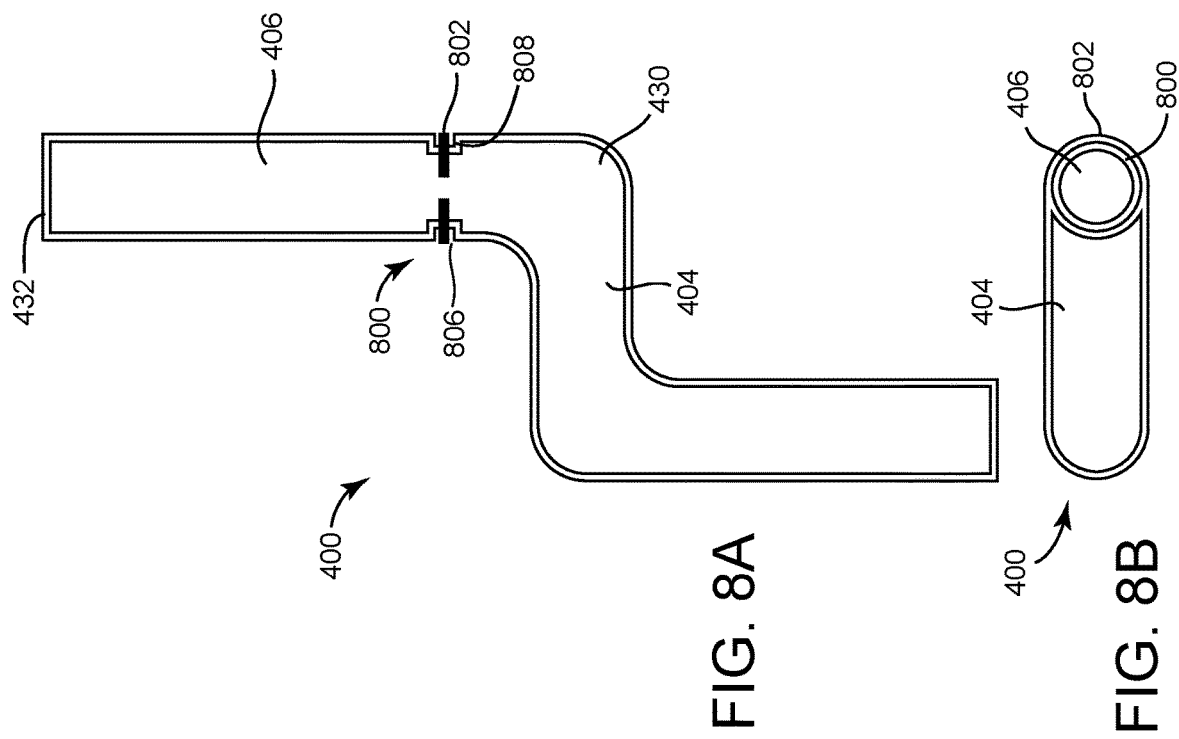
FIG. 8A
FIG. 8B

ACTUATOR WITH STACKED GEARS AND BEND SHAFT

BACKGROUND

The present disclosure relates generally to gear configurations for actuators. Actuators are mechanical devices configured to operate or actuate a wide variety of equipment. For example, actuators can be used to actuate a damper, a valve, a mechanical linkage or assembly, or any other type of mechanism or system.

An actuator typically includes a plurality of gears that engage with one another to create the desired actuation. Each gear rotates around its own central axis. Typically, each gear is mounted on a straight shaft that runs through that gear's central axis to a base of the actuator. Gears may be mounted at different heights off of the base. However, because the shafts are traditionally straight, each central axis must be positioned such that it does not intersect a gear mounted closer to the base. Conventional gear configurations therefore consume more than an ideal amount of space.

SUMMARY

One implementation of the present disclosure is an actuator with a housing, a gear train, and a bend shaft. The gear train is contained within the housing and coupled to a movable component outside the housing for driving the movable component between multiple positions. The gear train has a plurality of gears including a first gear and a second gear. The bend shaft is fixed to an internal surface of the housing and is configured to support the first gear and the second gear. The bend shaft includes a lower portion, a cross piece, and an upper portion. The lower portion has a first end coupled to the housing and a second end offset from the first end, and extends from the first end to the second end along a first direction. The crosspiece is oriented orthogonal to the first direction and extends from the second end of the lower portion. The upper portion has a third end coupled to the crosspiece and a fourth end offset from the third end, and extends from the third end to the fourth end along the first direction.

In some embodiments, the first gear is positioned on the lower portion and the second gear is positioned on the upper portion. In some embodiments, the first gear and the second gear each have an open axial channel. The lower portion passes through the open axial channel of the first gear and the upper portion passes through the open axial channel of the second gear. In some embodiments, the first gear is rotatable around a first axis, the second gear is rotatable around a second axis, and the first axis is offset from the second axis by a length of the cross piece.

In some embodiments, the actuator also include a third gear rotatable around a third axis and positioned between the second gear and the housing. The third axis is offset from the second axis and the second axis passes through the third gear.

In some embodiments, the lower portion, the crosspiece, and the upper portion are each substantially cylindrical. In some embodiments, the upper portion includes a gear support that supports the second gear. The gear support may be a circular slot depressed into the upper portion around a circumference of the upper portion and configured to receive a circular clip. The gear support may also be a ring around the upper portion, a pair of ledges protruding from the upper portion, and a flaring of a wall of the upper portion.

In some embodiments, the lower portion, the crosspiece, and the upper section are formed as one continuous member. In some embodiments, the actuator further comprises a cuff coupled to the housing and configured to receive the first end of the lower portion. The cuff may include a polygonal receptacle corresponding to a polygonal shape of the first end of the lower portion. The polygonal receptacle may secure the polygonal shape to retain the bend shaft in a desired orientation.

Another implementation of the present disclosure is a method of arrange gears in an actuator. The method includes providing a bend shaft that has a lower portion, a crosspiece, and an upper portion. The method also includes placing a first gear on the lower portion and a second gear on the upper portion. The lower portion has a first end coupled to a housing and a second end offset from the first end, and extends from the first end to the second end along a first direction. The crosspiece is oriented orthogonal to the first direction and extends from the second end of the lower portion. The upper portion has a third end coupled to the crosspiece and a fourth end offset from the third end, and extends from the third end to the fourth end along the first direction.

In some embodiments, the method also includes supporting the second gear on the upper portion by inserting a clip into a slot depressed into the upper portion around a circumference of the upper portion and setting the second gear on the clip. In some embodiments, the method also includes supporting the second gear on the upper portion by setting the second gear on at least one of a ring, a pair of ledges, and a flaring.

In some embodiments, placing the first gear on the lower portion and the second gear on the upper portion includes inserting the lower portion through an axial channel of the first gear and inserting the upper portion through an axial channel of the second gear. The method may also include providing a third gear on a second shaft. The third gear may be at least partially positioned between the upper portion and the housing.

Another implementation of the present disclosure is a bend shaft configured to support a gear train within a housing of an actuator. The gear train includes one or more gears. The bend shaft includes a lower portion, a cross piece, and an upper portion. The lower portion has a first end coupled to the housing and a second end offset from the first end, and extends from the first end to the second end along a first direction. The crosspiece is oriented orthogonal to the first direction and extends from the second end of the lower portion. The upper portion has a third end coupled to the crosspiece and a fourth end offset from the third end, and extends from the third end to the fourth end along the first direction.

In some embodiments, the lower portion the lower portion rotatably engages a first gear rotatable around a first axis and the upper portion rotatably engages a second gear rotatable around a second axis. The second axis intersects first gear.

BRIEF DESCRIPTION OF THE DRAWINGS

FIG. 6A is a side view of the bend shaft of FIG. 4 with protrusions, according to an exemplary embodiment.

FIG. 6B is a top view of the bend shaft shown in FIG. 6A, according to an exemplary embodiment.

FIG. 7A is a side view of the bend shaft of FIG. 4 with a ring, according to an exemplary embodiment.

FIG. 7B is a top view of the bend shaft shown in FIG. 7A, according to an exemplary embodiment.

FIG. 8A is a side view of the bend shaft of FIG. 4 with a slot and clip, according to an exemplary embodiment.

FIG. 8B is a top view of the bend shaft shown in FIG. 8A, according to an exemplary embodiment.

FIG. 9A is a side view of the bend shaft of FIG. 4 with a flaring, according to an exemplary embodiment.

FIG. 9B is a top view of the bend shaft shown in FIG. 9A, according to an exemplary embodiment.

DETAILED DESCRIPTION

Actuator and Valve Assembly

Figure 1B:
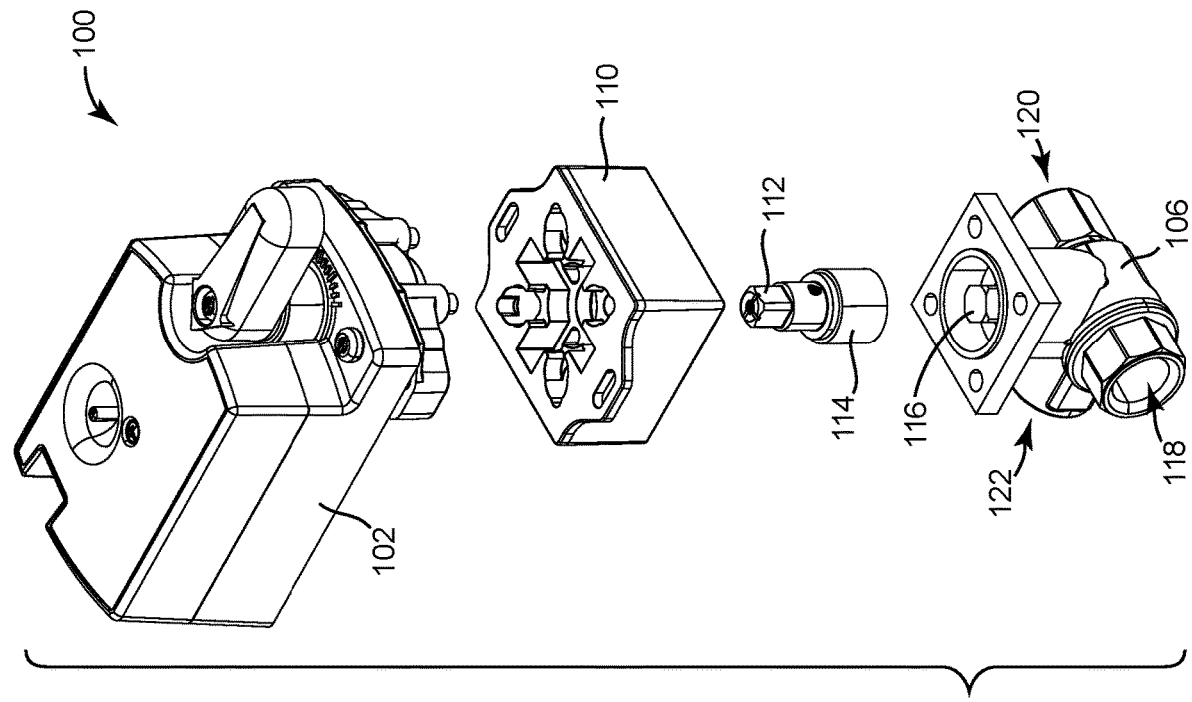
FIG. 1B is an exploded view of the valve assembly of FIG. 1A, according to some embodiments.
Figure 1A:
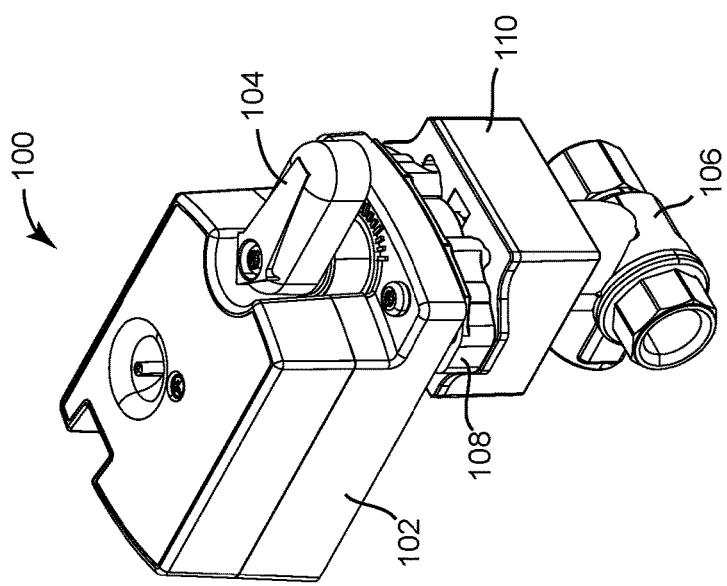
FIG. 1A is a perspective view of a valve assembly illustrating an example implementation of an actuator, according to some embodiments.

Referring now to FIGS. 1A and 1B, an example implementation of an actuator 102 as part of a valve assembly 100 is shown, according to some embodiments. FIG. 1A is a perspective view of valve assembly 100, whereas exploded perspective view of valve assembly 100. Valve assembly 100 is shown to include actuator 102 and a valve 106. Valve 106 regulates the flow of a liquid or gas through it by selectively providing a barrier that impedes the flow of the liquid or gas. Actuator 102 can be operated to control the flow of the liquid or gas through valve 106 by operating valve control knob 116 of valve 106.

Although actuator 102 is shown as part of valve assembly 100, it should be understood that actuator 102 can be used to actuate a wide variety of equipment. For example, actuator 102 can be used to actuate a damper, a valve, a mechanical linkage or assembly, or any other type of mechanism or system. Actuating the mechanism or system may include driving a moveable component of the mechanism or system between multiple positions, such as driving a valve between an open and closed position, for example. In some embodiments, actuator 102 is used to operate a valve or damper in a HVAC system. In various embodiments, actuator 102 may be a linear actuator (e.g., a linear proportional actuator), a non-linear actuator, a spring return actuator, or a non-spring return actuator. The following paragraphs describe an example implementation of actuator 102 as part of valve assembly 100.

Valve control knob 116 can be attached to valve 106 such that rotation of valve control knob 116 about its principal axis regulates the opening and closing of valve 106. For example, if valve 106 is a ball valve, valve control knob 116 may be coupled to a ball internal to valve 106 having a port hole extending through the ball. As valve control knob 116 is rotated about its principal axis, the ball is also rotated. When valve 106 is fully open, it allows the flow of a liquid or gas through valve openings 118, 120, and/or 122. When valve 106 is fully closed, it prevents the flow of a liquid or gas through valve openings 118, 120, and/or 122.

Actuator 102 may include pointer 104, which provides visual indicia (e.g. an arrow, a line, etc.) of the position of valve control knob 116. Pointer 104 may be operably coupled to driver 124, drive shaft 112, and valve control knob 116 such that pointer 104 rotates with valve control knob 116. In some embodiments, actuator 102 may also operate valve 106 in response to control signals received by actuator 102. For example, actuator 102 may operate valve 106 in response to signals received from a field controller or other computing device. The signals may be communicated through any number of types of communications (e.g. a wired connection, a wireless connection, etc.).

Valve assembly 100 is shown to include actuator bracket 108. Actuator bracket 108 couples actuator 102 to adapter bracket 110. Actuator bracket 108 may be configured to couple with one or more different types of valve actuators, mounting brackets, and valves. For example, actuator bracket 108 may be configured to be coupled with actuator 102 or a different type of valve actuator. In some embodiments, actuator bracket 108 is also configured to couple actuator 102 to valve 106, allowing adapter bracket 110 to be selectively used.

Valve assembly 100 is shown to include adapter bracket 110, drive shaft 112, and interchangeable connector 114. In some embodiments, adapter bracket 110, drive shaft 112, and interchangeable connector 114 collectively represent a universal adapter assembly allowing actuator 102 to operate a variety of valve 106 configurations. Adapter bracket 110 is generally configured to couple actuator bracket 108 to mounting pad 146 of valve 106. Adapter bracket 110 may include an opening that engages drive shaft 112. Drive shaft 112 may include an aperture that engages a proximal end of interchangeable connector 114. A distal end of interchangeable connector 114 may include an aperture configured to engage valve control knob 116. In this regard, rotation of pointer 104 causes drive shaft 112 and interchangeable connector 114 to rotate, thereby causing valve control knob 116 to rotate about its principal axis.

Figure 1C:
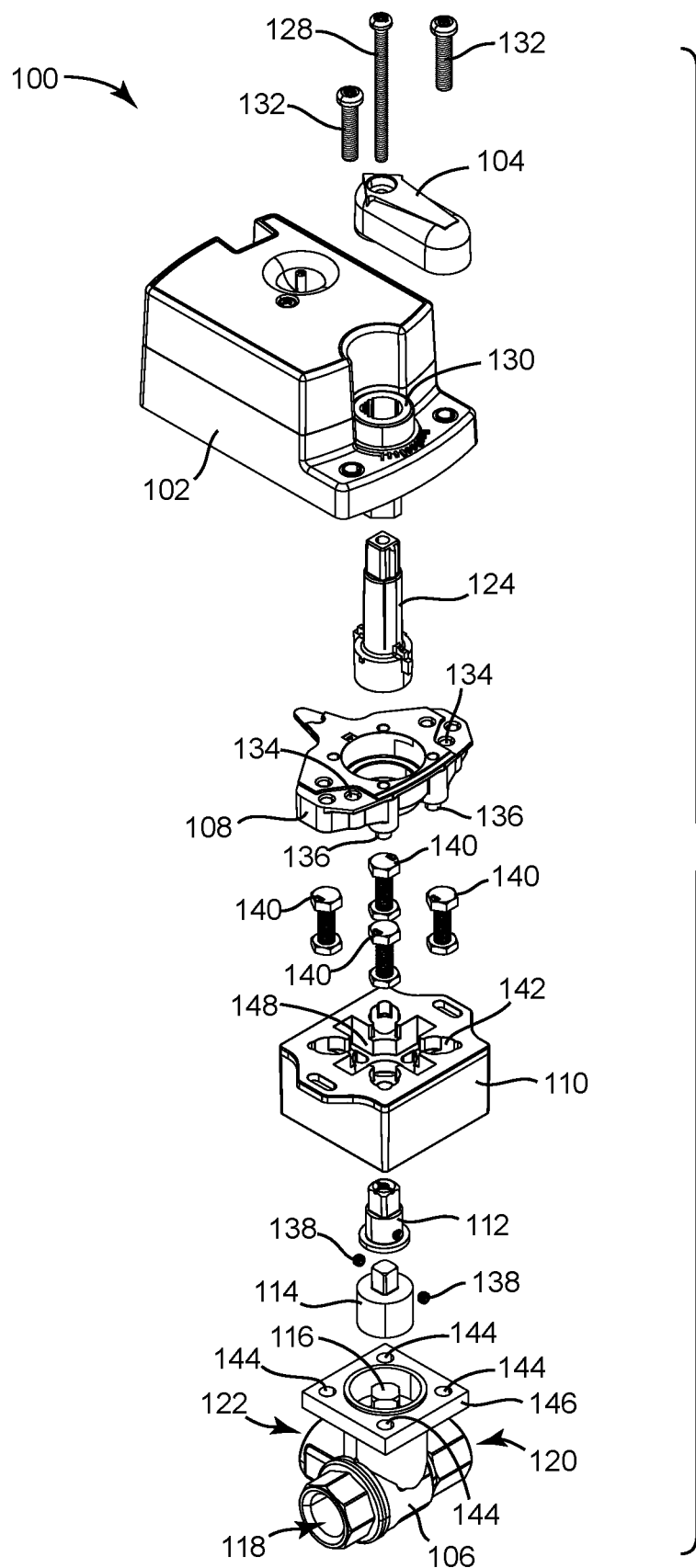
FIG. 1C is another exploded view of the valve assembly of FIG. 1A, according to some embodiments.

Referring now to FIG. 1C, another exploded perspective view of valve assembly 100 is shown, according to some embodiments. Actuator 102 and actuator bracket 108 can be configured to receive one or more fasteners 132 to couple actuator bracket 108 to actuator 102. For example, fasteners 132 may be threaded bolts that provide a compressive force to actuator 102 and actuator bracket 108 when engaged with threaded apertures of actuator bracket 108. In other embodiments, actuator bracket 108 may be secured to actuator 102 in any number of ways (e.g. adhesive, welding, nuts, etc.).

Actuator bracket 108, pointer 104, driver 124, and drive shaft 112 can be coupled by stem fastener 128. For example, stem fastener 128 may be a threaded bolt that provides a compressive force to secure actuator bracket 108, pointer 104, driver 124, and drive shaft 112 to actuator 102 when engaged with threaded aperture of drive shaft 112. Actuator 102 can be configured to selectively rotate driver 124 about the axis formed by stem fastener 128. For example, pointer 104 can contain an aperture configured to engage an upper end of driver 124. A lower end of driver 124 contains an aperture configured to engage an upper end of drive shaft 112. In this regard, rotation of driver 124 causes drive shaft 112 to rotate and, in turn, valve control knob 116 to also rotate, thereby controlling the flow of the liquid or gas through valve 106. Pointer 104 also rotates with driver 124 and provides a visual indication of the position of valve control knob 116. In various embodiments, pointer 104, driver 124, and drive shaft 112 can be coupled in any number of ways (e.g. adhesive, welding, nuts, etc.).

Actuator bracket 108 is shown to have mounting posts 136. Mounting posts 136 can be configured to engage one or more apertures 142 of adapter bracket 110 and provide added stability to actuator 102. In some embodiments, mounting posts 136 are also configured to engage apertures 144 of valve mounting pad 146, allowing adapter bracket 110, drive shaft 112, and interchangeable connector 114 to be optionally used in valve assembly 100.

One or more fasteners 140 may be provided to secure adapter bracket 110 to mounting pad 146 of valve 106. For example, fasteners 140 may be threaded bolts that are inserted through adapter bracket 110 and apertures 144 of mounting pad 146. Engaging fasteners 140 to one or more nuts creates a compressive force that secures adapter bracket 110 to valve 106. In other embodiments, adapter bracket 110 may be secured to valve 106 by any number of securing means (e.g. adhesive, welding, etc.). Adapter bracket 110 may also house drive shaft 112 and interchangeable connector 114 when adapter bracket 110 is secured to valve 106. Drive shaft 112 and interchangeable connector 114 can be provided within aperture 148 of adapter bracket 110. Rotation of drive shaft 112 within aperture 148 of adapter bracket 110 also causes valve control knob 116 to rotate, thereby operating valve 106.

In some embodiments, actuator 102 is provided with drive device 130. Drive device 130 can be a drive mechanism, a hub, or other device configured to drive or effectuate rotational movement of driver 124. For example, drive device 130 may include an aperture configured to engage a portion of driver 124. Drive device 130 can control the rotation of driver 124 by providing force to walls of driver 124 along its principal axis, causing driver 124 to experience a rotational force. In some embodiments, actuator 102 may include a mechanical system to control drive device 130. For example, the mechanical system can include a motor that drives the drive device 130 in response to received control signals.

Figure 1D:
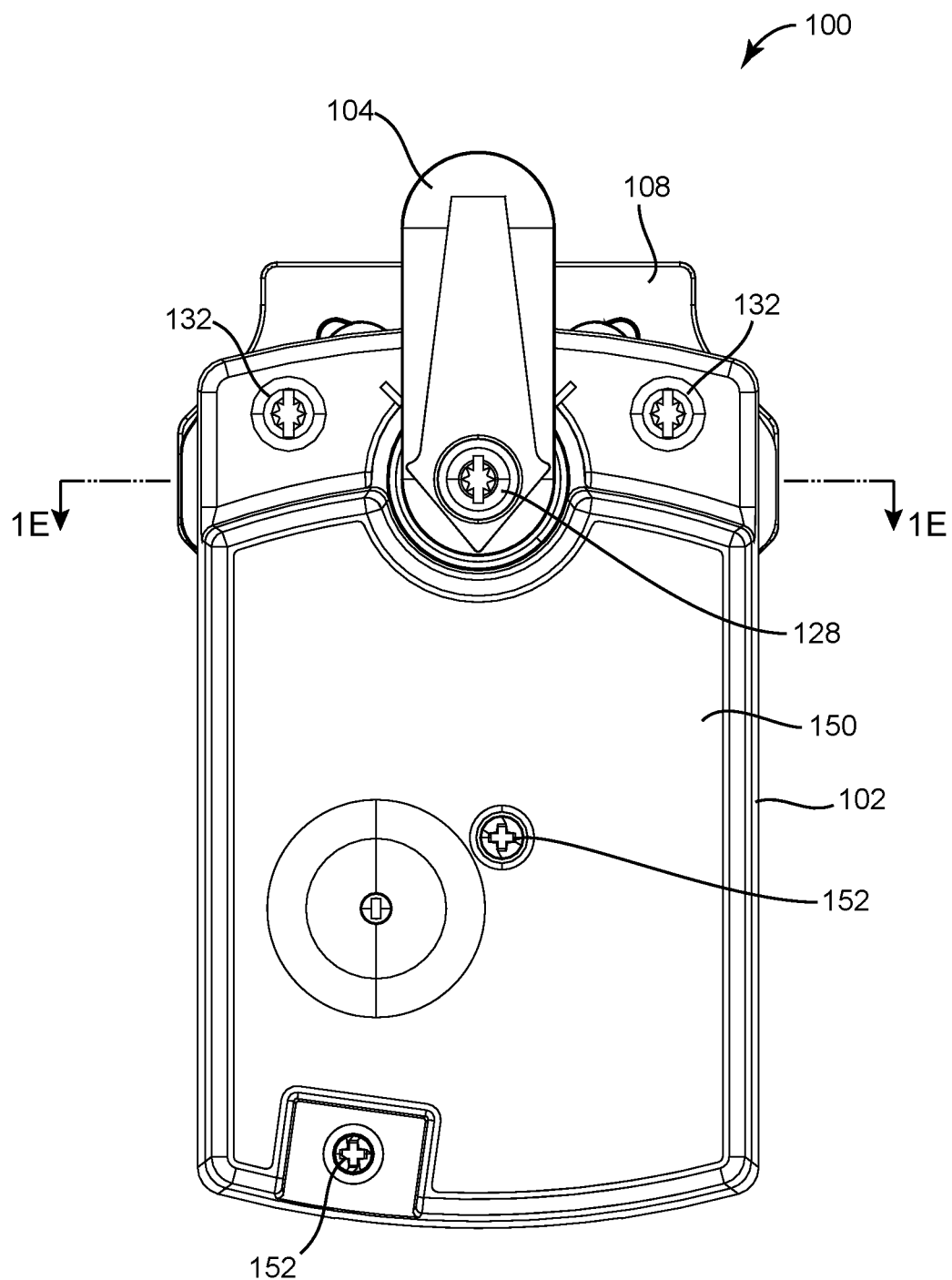
FIG. 1D is a top plan view of the valve assembly of FIG. 1A, according to some embodiments.

Referring now to FIG. 1D, actuator 102 may include a generally flat surface 150 provided on an upper housing of actuator 102. In some embodiments, the upper housing of actuator 102 houses components for facilitating operation of the drive device 130, such as a motor, wiring, interfaces, etc. Fasteners 152 may be threaded fasteners received by a set of apertures provided on surface 150. Fasteners 152 contact surface 150 and provide compressive force securing the upper housing to actuator 102 when threaded into the upper housing to actuator 102.

Figure 1E:
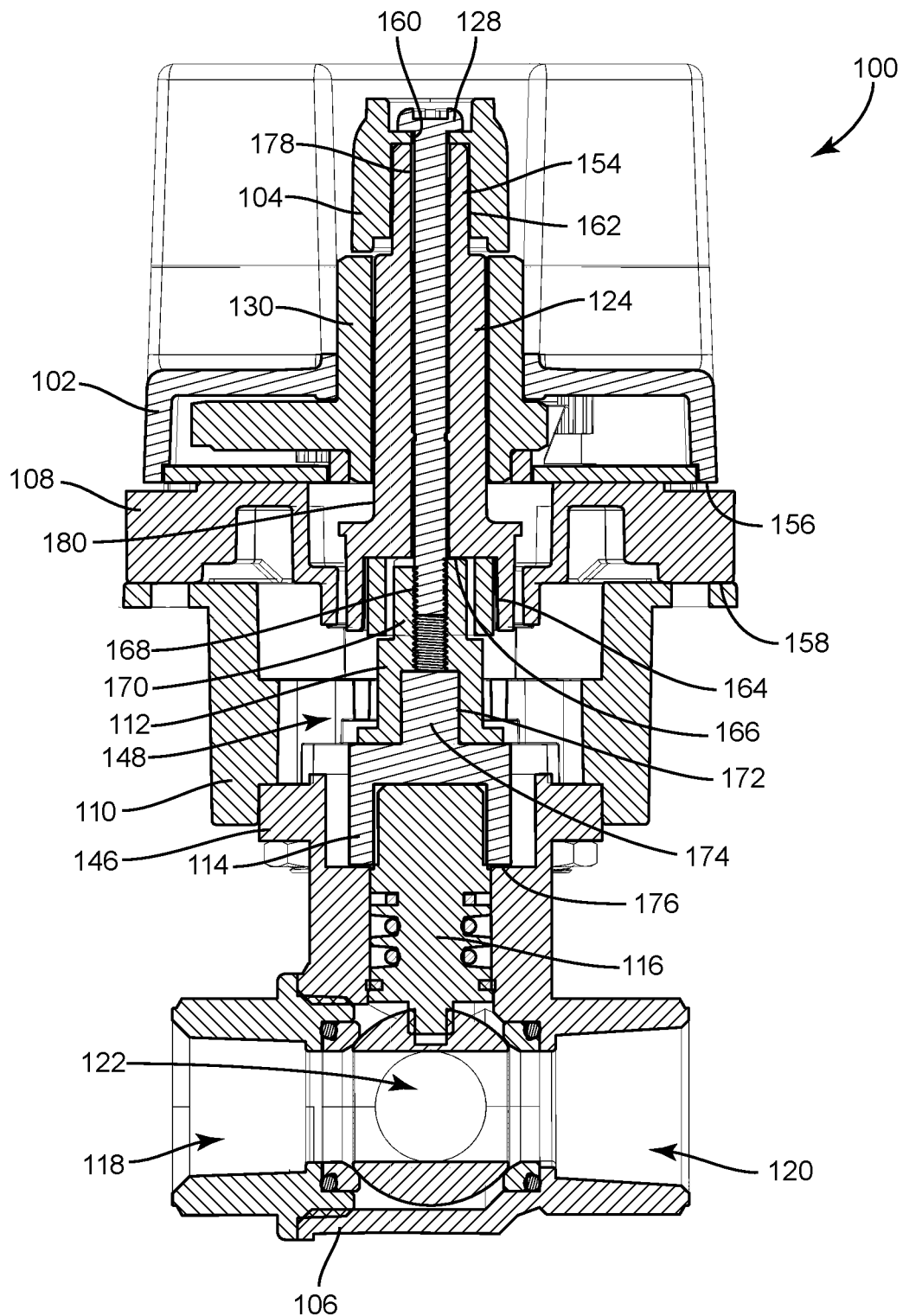
FIG. 1E is a sectional view of the valve assembly of FIG. 1A, according to some embodiments.

Referring now to FIG. 1E, pointer 104 is shown to have opening 160 configured to receive stem fastener 128 in a direction perpendicular to surface 150. Stem fastener 128 extends through opening 178 of driver 124 and may be configured to engage aperture 168 of drive shaft 112. Stem fastener 128 may be threadably coupled to aperture 168 of drive shaft 112. This feature is described in greater detail in U.S. Provisional Patent Application No. 62/533,919 filed Jul. 18, 2017, the entire disclosure of which is incorporated by reference herein. In another embodiment, stem fastener 128 is secured to drive shaft 112 in any number of ways (e.g. by engaging threaded nuts, weld beads, etc.).

In some embodiments, stem fastener 128 is configured to supply compressive force to pointer 104 when stem fastener 128 engages aperture 168. This force secures pointer 104 to actuator 102. Engaging stem fastener 128 to aperture 168 of drive shaft 112 also provides compressive force to adapter bracket 110, thereby securing adapter bracket 110 to surface 158 of actuator bracket 108. This also provides compressive force securing actuator bracket 108 to surface 156 of actuator 102, shown in greater detail in U.S. Provisional Patent Application No. 62/533,919.

Pointer 104 is shown to have aperture 154 configured to engage stem portion 162 of driver 124. In this regard, aperture 154 has a diameter greater than a diameter of stem portion 162 of driver 124. In some embodiments, aperture 154 may have a rectangular shape corresponding to a rectangular shape of stem portion 162 of pointer 104, thereby allowing pointer 104 to rotate driver 124 along its primary axis.

Driver 124 is shown to include stem portion 162 configured to extend through drive device 130 of actuator 102. Stem portion 162 engages with aperture 154 of pointer 104 allowing driver 124 to rotate along its primary axis within drive device 130. Driver 124 may also include drive portion 166 that extends through opening 180 of actuator bracket 108. Drive portion 166 of driver 124 may include one or more flanges extending perpendicular to the primary axis of driver 124. In this regard, drive portion 166 of driver 124 can be configured such that driver 124 can travel through opening 180 of actuator bracket 108 until flanges of drive portion 166 engage an inner surface of actuator bracket 108.

Drive portion 166 of driver 124 may include an aperture 164 extending in the same direction as opening 178. Aperture 164 can be configured to engage driver portion 170 of drive shaft 112. Aperture 164 has a diameter greater than diameter of driver portion 170 of drive shaft 112. Aperture 164 may have a rectangular shape corresponding to a rectangular shape of driver portion 170. In this regard, rotation of driver 124 along its principal axis causes rotation of drive shaft 112 along the same axis.

Drive shaft 112 may include driver portion 170 configured to engage aperture 164 of driver 124, as described above. Driver portion 170 of shaft 112 is shown to include aperture 168 configured to receive stem fastener 128 and secure stem fastener 128 to shaft 112. For example, stem fastener 128 may be threadably coupled to aperture 168 to secure stem fastener 128 to shaft 112. Drive shaft 112 may include an aperture 172 that is configured to engage interchangeable connector 114 such that rotation of drive shaft 112 also causes interchangeable connector 114 to rotate along the same axis.

Interchangeable connector 114 may include drive portion 174 configured to engage aperture 172 of drive shaft 112. For example, interchangeable connector 114 can have an aperture 176 that is configured to engage valve control knob 116 of valve 106. Interchangeable connector 114 is selected from a plurality of interchangeable connectors, whereby each interchangeable connector in the set can be configured to engage a particular valve 106 from a group of valves. In this regard, aperture 176 of the selected interchangeable connector 114 can be configured to engage control knob 116 of valve 106. Actuator 102 and other components described herein (e.g. pointer 104, actuator bracket 108, adapter bracket 110, driver 124, drive shaft 112) can be used with a particular valve 106 from the group of valves by selecting an interchangeable connector 114 configured to engage valve control knob 116.

Actuator with Compound Spur Gears

Figure 2A:
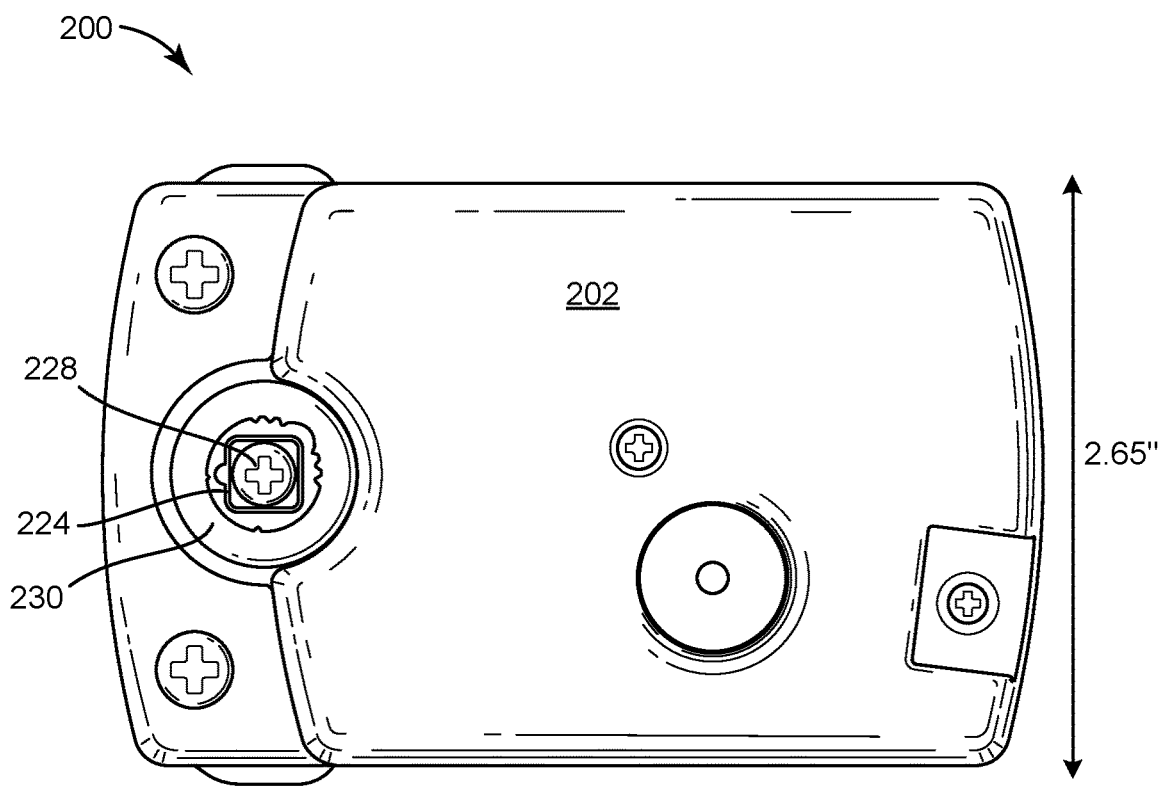
FIG. 2A is a top view of an actuator with a compound spur gear train, according to some embodiments.
Figure 2B:
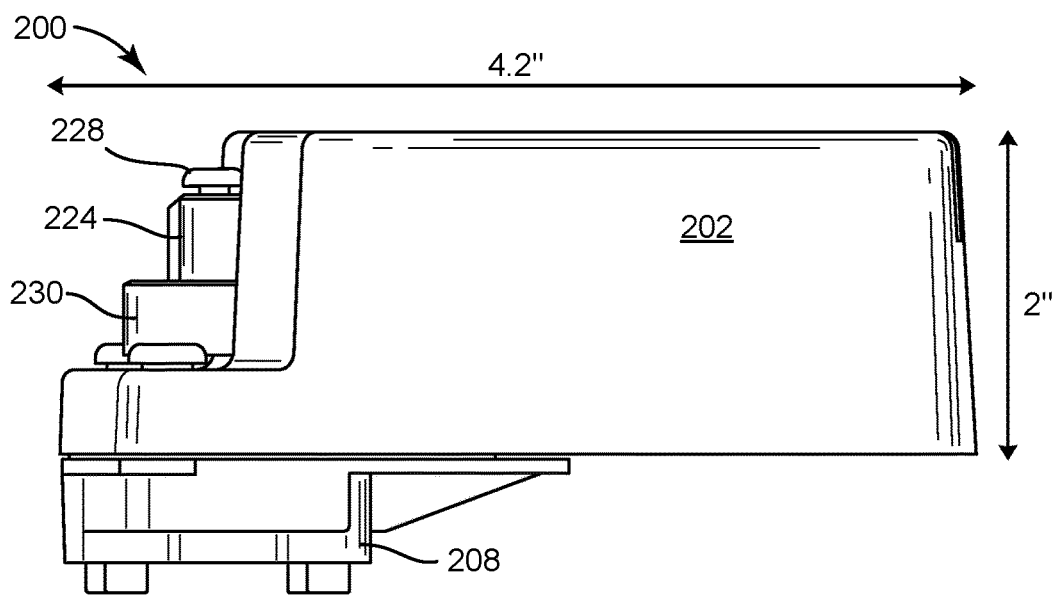
FIG. 2B is a side view of the actuator of FIG. 2A, according to some embodiments.

Referring now to FIGS. 2A-2B, an actuator 200 with compound spur gears is shown, according to some embodiments. Actuator 200 may include some or all of the features of actuator 102, as described with reference to FIGS. 1A-1E. For example, actuator 200 is shown to include a drive device 230, a driver 224, a stem fastener 228, and an actuator bracket 208. These components may be the same as drive device 130, driver 124, stem fastener 128, and actuator bracket 108 of actuator 102, respectively, as previously described. Actuator 200 is also shown to include a housing 202. Housing 202 may be a shell, casing, or other type of housing configured to contain the internal components of actuator 200.

Figure 2C:
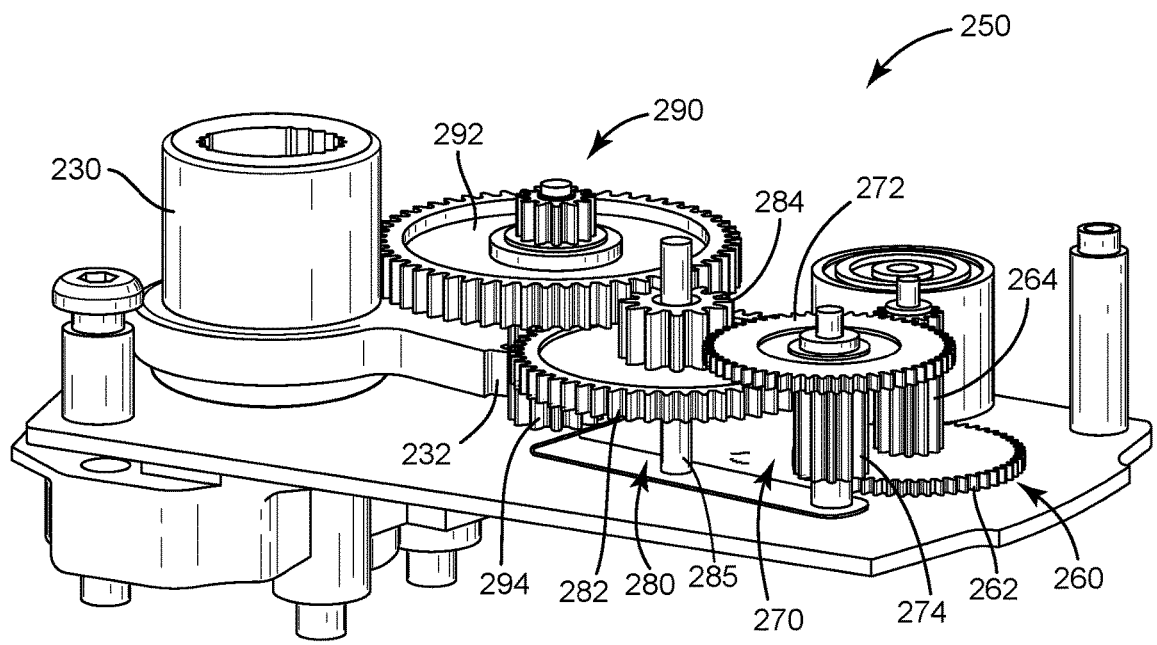
FIG. 2C is a perspective view of the compound spur gear train of the actuator of FIG. 2A, according to some embodiments.
Figure 2D:
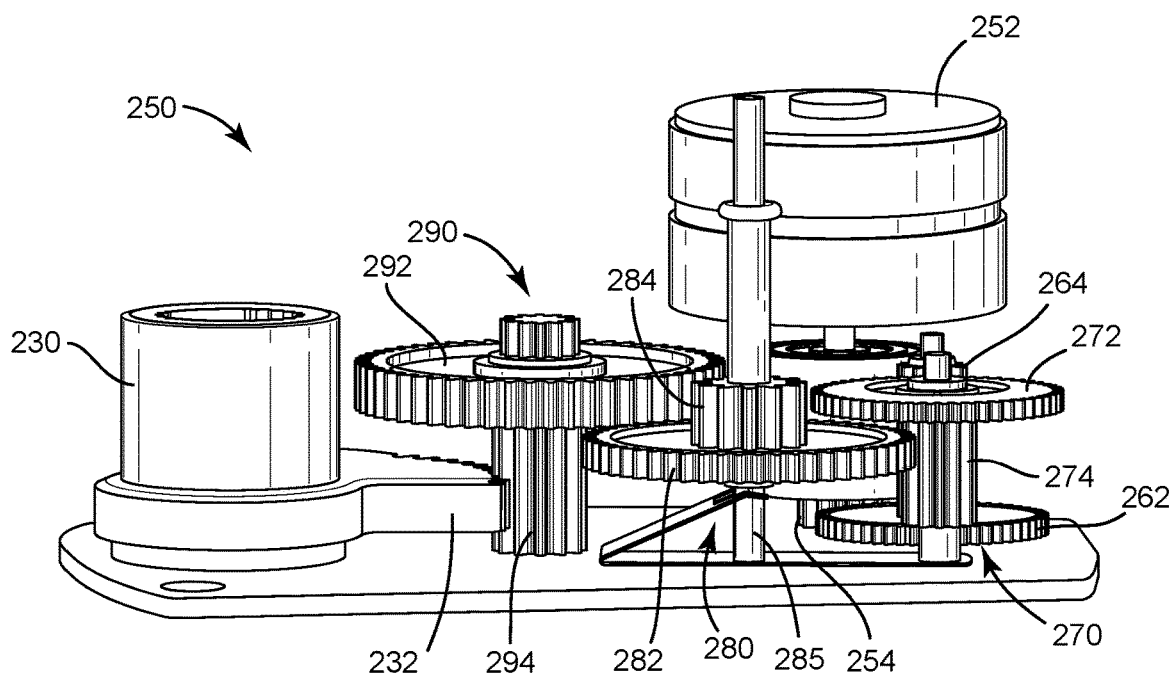
FIG. 2D is another perspective view of the compound spur gear train of the actuator of FIG. 2A, according to some embodiments.

Referring now to FIGS. 2C-2D, a gear train 250 is shown, according to some embodiments. Gear train 250 may be located within housing 202 and may be a part of actuator 200. Gear train 250 can be configured to amplify the torque exerted by motor 252 on drive device 230 by providing a mechanical advantage via multiple stages of meshing gears. Accordingly, gear train 250 may function as a torque amplifier or speed reducer when translating the input rotation and torque of motor 252 to an output rotation and torque of drive device 230. In some embodiments, gear train 250 has an overall gear ratio of approximately 2820:1, meaning that gear train 250 amplifies the torque of motor 252 by a factor of approximately 2820. This allows drive device 230 to exert a torque approximately 2820 times greater than the torque provided by motor 252 and allows actuator 200 to more precisely control the position of drive device 230 by causing drive device 230 to rotate approximately 2820 times more slowly than motor 252.

Gear train 250 is shown to include multiple compound spur gears 260, 270, 280, and 290 that link motor 252 to drive device 230. Compound spur gear 260 is shown to include a large gear 262 and a pinion gear 264. Gears 262-264 may be fixed to a common axle that passes through the center of both gears 262-264 such that gears 262-264 rotate at the same rotational speed. Large gear 262 may mesh with a motor pinion 254 fixed to the shaft of motor 252. Large gear 262 may have a larger diameter than motor pinion 254 and more gear teeth than motor pinion 254 such that the meshing between motor pinion 254 and large gear 262 acts as a first stage of the gear reduction.

Compound spur gear 270 is shown to include a large gear 272 and a pinion gear 274. Gears 272-274 may be fixed to a common axle that passes through the center of both gears 272-274 such that gears 272-274 rotate at the same rotational speed. Large gear 272 may mesh with pinion gear 264 of compound spur gear 260. Large gear 272 may have a larger diameter than pinion gear 264 and more gear teeth than pinion gear 264 such that the meshing between pinion gear 264 and large gear 272 acts as a second stage of the gear reduction.

Compound spur gear 280 is shown to include a large gear 282 and a pinion gear 284. Gears 282-284 may be fixed to a common axle 285 that passes through the center of both gears 282-284 such that gears 282-284 rotate at the same rotational speed. Large gear 282 may mesh with pinion gear 274 of compound spur gear 270. Large gear 282 may have a larger diameter than pinion gear 274 and more gear teeth than pinion gear 274 such that the meshing between pinion gear 274 and large gear 282 acts as a third stage of the gear reduction.

Compound spur gear 290 is shown to include a large gear 292 and a pinion gear 294. Gears 292-294 may be fixed to a common axle that passes through the center of both gears 292-294 such that gears 292-294 rotate at the same rotational speed. Large gear 292 may mesh with pinion gear 284 of compound spur gear 280. Large gear 292 may have a larger diameter than pinion gear 284 and more gear teeth than pinion gear 284 such that the meshing between pinion gear 284 and large gear 292 acts as a fourth stage of the gear reduction.

Drive device 230 is shown to include a drive device gear 232. Drive device gear 232 may be fixed to drive device 230 such that drive device gear 232 and drive device 230 rotate at the same rotational speed. Drive device gear 232 may mesh with pinion gear 294 of compound spur gear 290. Drive device gear 232 may have a larger diameter than pinion gear 294 and more gear teeth than pinion gear 294 such that the meshing between pinion gear 294 and drive device gear 232 acts as a fifth stage of the gear reduction.

As shown in FIGS. 2C-2D, the gear reduction provided by gear train 250 includes five stages (i.e., five different gear meshings) and four compound spur gears 260, 270, 280, and 290. Each stage may provide a gear ratio between 4:1 and 5:1 such that the overall gear ratio provided by the five stages is approximately 2820:1. Due to the number of moving components, gear train 250 may require a substantially large space within housing 202. For example, housing 202 is shown having a height of approximately 2", a width of approximately 4.2", and a depth of approximately 2.65", as shown in FIGS. 2A-2B.

Actuator with Straight Gear Shafts

Figure 3:
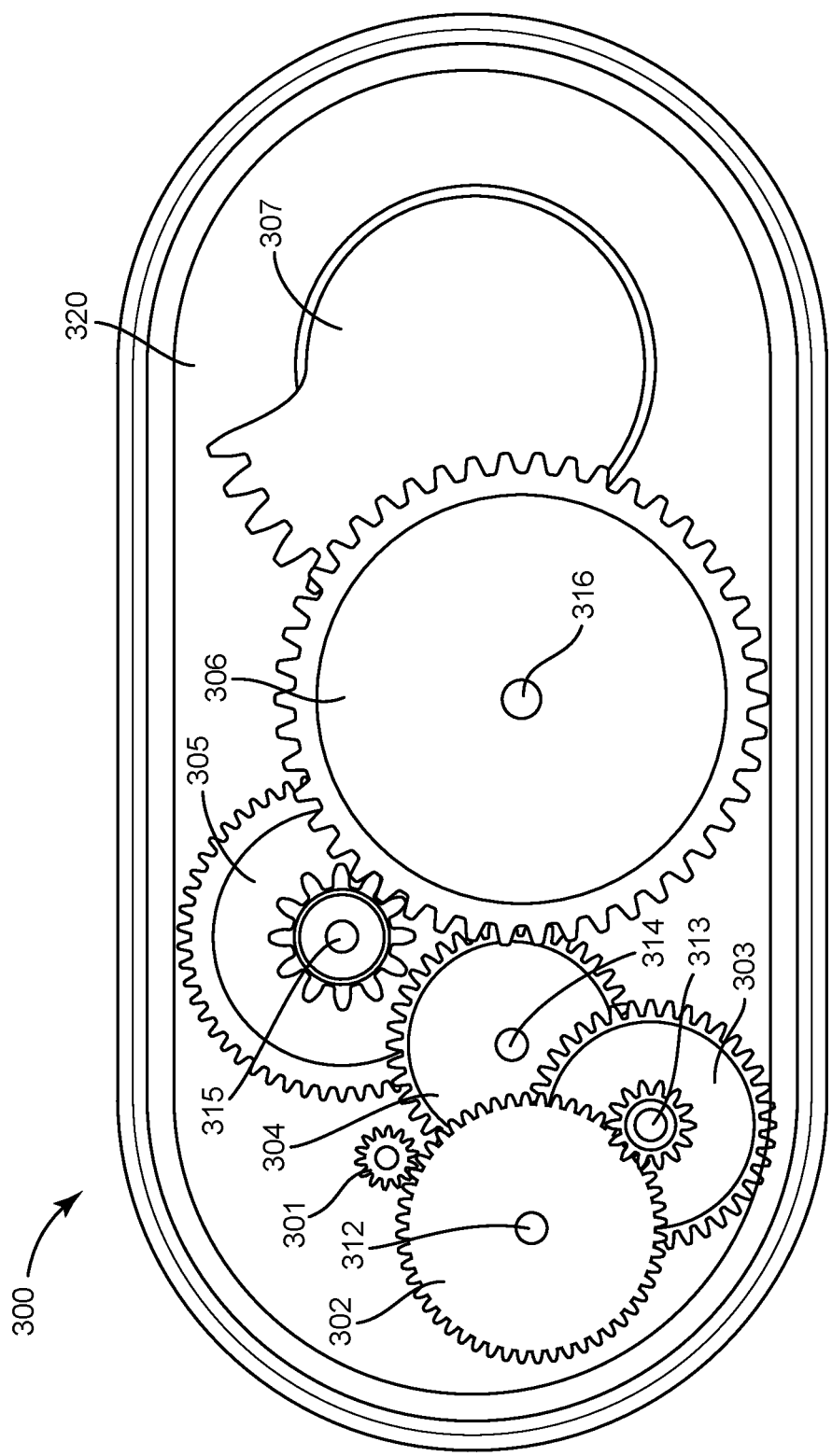
FIG. 3 is a top view of a conventional gear arrangement in an actuator.

Referring to FIG. 3, a depiction of a conventional gear arrangement in an actuator is shown for the sake of background. Gear box 300 includes a variety of gears 302-306 configured to translate input rotation from an input cog 301 to an output gear 307. Each gear 302-306 may include two substantially solid circular disks of different radii, one fixedly stacked on the other. Each gear is configured to rotate together around a central axis: gear 302 rotates around axis 312, gear 303 rotates around axis 313, gear 304 rotates around axis 314, gear 305 rotates around axis 315, and gear 306 rotates around axis 316. Each gear has teeth that engage with the teeth of a neighboring gear: as shown in FIG. 3, the input cog 301 engages gear 302, gear 302 engages gear 303, gear 303 engages gear 304, gear 304 engages gear 305, gear 305 engages gear 306, and gear 306 engages output gear 307. Rotation of one of the gears 302-306 thus causes the rotation of all other gears 302-306.

A straight shaft (for example, axle 285 shown in FIGS. 2C-D), is positioned at each axis 312-316, extending from each gear 302-306 to a base 320 of the gear box 300. Each straight shaft is configured to rotatably secure the corresponding gear 302-306 at a fixed distance from the base 320. Importantly, a gear 302-306 cannot intersect a straight shaft, as the gears 302-306 need to rotate and the straight shafts are fixed structures.

Gears 302-306 in gearbox 300 are therefore positioned to not intersect the straight shafts (i.e., such that the central axes 312-316 do not extend through a different gear 302-306). For example, the central axis 314 of gear 304 is positioned between gear 303 and gear 305 so that a straight shaft can extend from the base 320 to gear 304 without intersecting gear 303 or gear 305. The possible configurations and alignment of the gears 302-306 is thereby limited, and generally results in gears 302-306 consuming more than a preferable amount of space in the gear box 300.

Actuator with Bend Shaft for Stacked Gears

Figure 4:
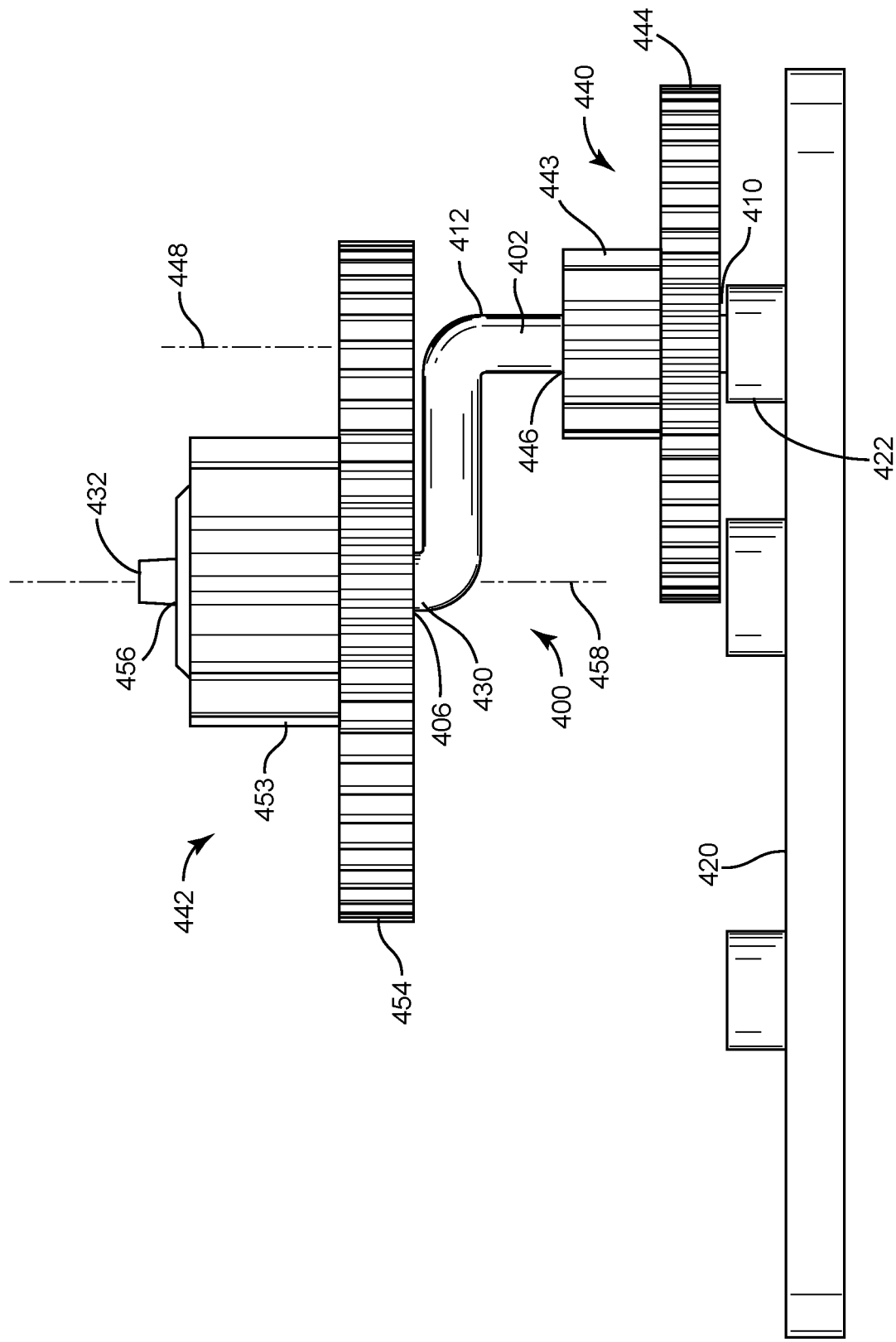
FIG. 4 is a side view of a bend shaft with two gears, according to an exemplary embodiment.

Referring now to FIG. 4, a side view of a bend shaft with two gears is shown, according to an exemplary embodiment. Bend shaft 400 has a lower portion 402, a crosspiece 404, and an upper portion 406. The lower portion 402, the crosspiece 404, and the upper portion 406 are each substantially cylindrical. The lower portion 402 extends from a first end 410 to a second end 412. The first end 410 is configured to be coupled to a base 420, for example by cuff 422. The first end 410 may be shaped as a polygon corresponding to a polygonal recess in the cuff 422, so that the bend shaft 400 can be secured in a desired orientation relative to the base 420 (i.e., so that the bend shaft 400 is prevented from rotating around the lower portion 402 or moving/rotating relative to the base 420). When coupled to the base 420, the lower portion 402 extends away from the base 420 and is oriented substantially orthogonal to the base 420.

Crosspiece 404 is oriented substantially orthogonal to the lower portion 402 and substantially parallel to the base 420. Crosspiece 404 extends from the second end 412 of the lower portion to a connected end 430 of the upper portion 406. The upper portion 406 extends from the connected end 430 of the upper portion 406 to a free end 432 of the upper portion 406. The upper portion 406 is oriented parallel to the lower portion 402 and substantially orthogonal to the base 420 and the crosspiece 404.

The lower portion 402, the crosspiece 404, and the upper portion 406 may be formed as unified whole. In other embodiments, the lower portion 402, the crosspiece 404, and the upper portion 406 may be manufactured as separate components and later coupled together in the described configuration.

Figure 5A:
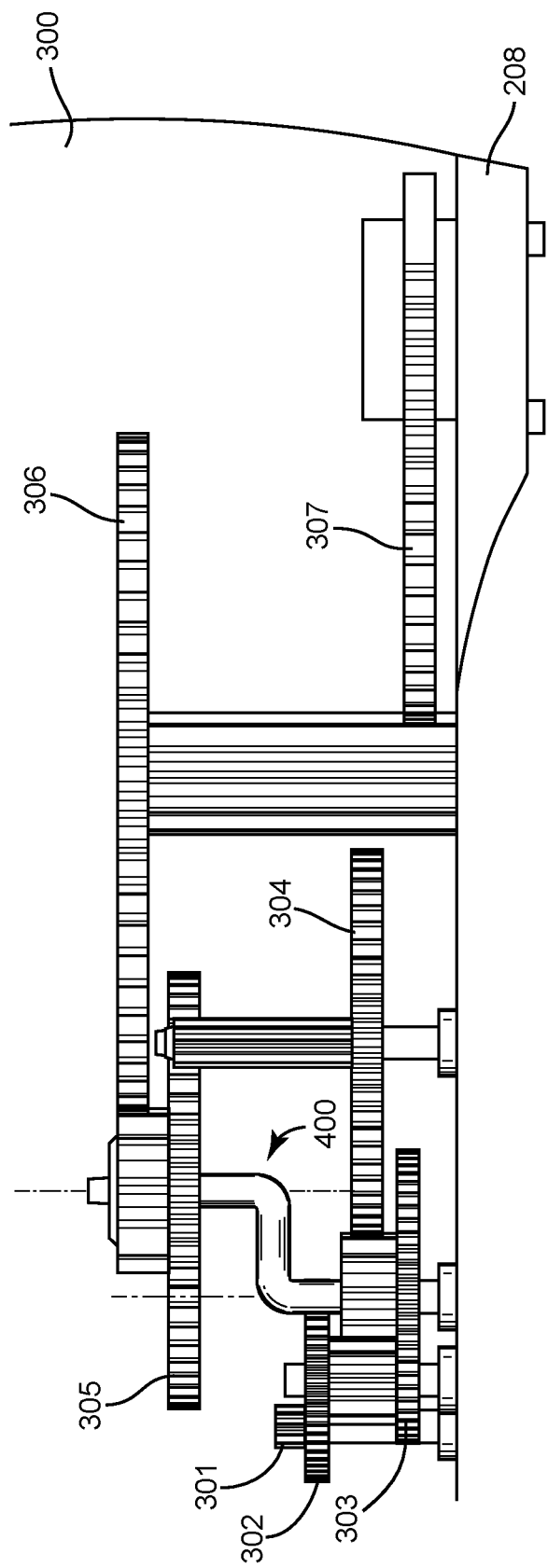
FIG. 5A is a side view of a gear arrangement in an actuator using the bend shaft of FIG. 2, according to an exemplary embodiment.
Figure 5B:
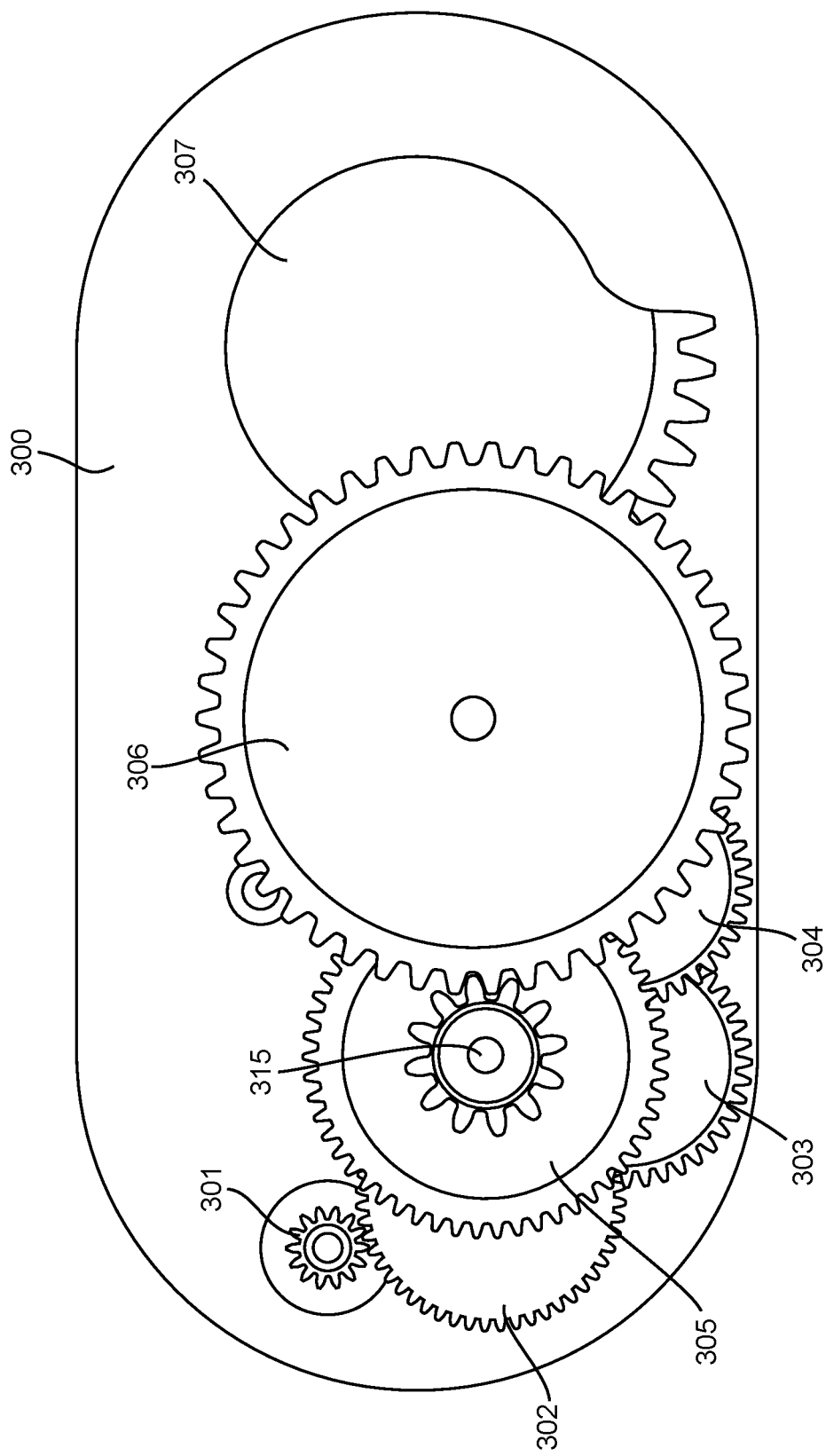
FIG. 5B is a top view of the gear arrangement of FIG. 5A using the bend shaft of FIG. 2, according to an exemplary embodiment.

In FIG. 4, the bend shaft 400 is shown with a first gear 440 and a second gear 442. In some embodiments, the first gear 440 and the second gear 442 gears are included in a gear train that includes a plurality of gears, for example as shown in FIGS. 5A-5B. The first gear 440 and/or the second gear 442 may be an initial gear engaged by a motor in the actuator, an output gear coupled to a mechanism outside the actuator, or have any position in a system of gears positioned within an actuator. The first gear 440 may directly engage the second gear 442, or one or more gears may be arranged to link a rotation of the first gear 440 to a rotation of the second gear 442.

The first gear 440 includes two substantially solid circular disks of different radii, more particularly small cog 443 fixedly stacked on big cog 444. Both cogs 443, 444 have teeth configured to engage teeth on other gears. An open axial channel 446 is centered on and extends through both the small cog 443 and big cog 444 and defines a central axis 448 of the first gear 440.

The lower portion 402 of the bend shaft 400 extends through the open axial channel 446 of the first gear 440 such that the first gear 440 is configured and positioned to rotate around the lower portion 402.

The second gear 442 includes two substantially solid circular disks of different radii, more particularly small cog 453 fixedly stacked on big cog 454. Both cogs 453, 454 have teeth configured to engage teeth on other gears. An open axial channel 456 is centered on and extends through both the small cog 453 and big cog 454 and defines a central axis 458 of the second gear 442.

The open axial channel 456 is centered on the second gear 442 and defines a central axis 458 of the second gear 442. The upper portion 406 extends through the open axial channel 456 of the second gear 442, such that the second gear 442 is configured and positioned to rotate around the upper portion 406. The upper portion may 406 include a mount configured to support the second gear 442. Several examples of mounts which can be used to support the gears 440 and 442 are described in detail with reference to FIGS. 6A-9B.

As shown in FIG. 4, the central axis 458 of the second gear 442 (i.e., the axis about which the second gear 442 rotates) can intersect the first gear 440 without impeding the rotation of the first gear 440. In other words, the bend shaft 400 allows the first gear 440 to be partially positioned between the open axial channel 456 of the second gear 442 and the base 420. The bend shaft 400 may therefore be most advantageous when the length of the crosspiece 404 is less than or equal to a radius of the first gear 440.

The bend shaft 400 may also allow a third gear mounted on a separate shaft to be intersected by the central axis 458 of the second gear 442. The third gear, for example, may engage with the small cog 443 of first gear 440 and/or the big cog 454 of the second gear 442. The bend shaft 400 therefore advantageously allows for a greater number of potential gear configurations, including more compact gear configurations.

Referring now to FIGS. 5A-B, a top view and a side view of the gear box 300 as in FIG. 3 are shown with a compact gear configuration made possible by bend shaft 400 of FIG. 4, according to an exemplary embodiment. Gear box 300 contains the gears 302-306 shown in FIG. 3 arranged in a different configuration but still arranged to engage each other in the same order, such that input cog 301 rotates gear 302, which rotates gear 303, which rotates gear 304, which rotates gear 305, which rotates gear 306, which rotates output gear 307. The output gear 307 may be coupled to a movable component outside the housing for driving the movable component between multiple positions, for example a valve movable between an open and closed position and coupled using bracket 208 shown in FIG. 2B, or as described with reference to FIGS. 1A-1E.

In the configuration shown in FIGS. 5A-B, gears 303 and 305 are mounted on bend shaft 400. When mounted on the bend shaft 400 as described with reference to FIG. 4, gear 303 may correspond to the first gear 440 and gear 305 may correspond to the second gear 442.

As shown in FIGS. 5A-B, the central axis 315 of gear 305 intersects gear 303. Gear 305 may thereby be mounted closer to gear 303 than possible without the bend shaft 400. By mounting gears 303 and 305 on the same bend shaft, gears 302 and 304 may also be positioned partially underneath gear 305. For example, the central axis 315 of gear 305 may also intersect gear 304.

With the help of the bend shaft 400, gears 302-306 consume less area in gear box 300 than in the configuration of FIG. 3. This saved space may be utilized to place additional advantageous components, such as a circuit board used to control the actuator, a motor, a power converter, a battery, and/or a fan, in the gear box 300. In some embodiments, the size of the gear box 300 may be reduced. Reduced size may reduce production costs, render the gear box 300 less obtrusive, and allow for placement of the gear box 300 in smaller receptacles.

Referring generally to FIGS. 6A-9B, a variety of configurations of a mount for supporting the second gear 442 on the upper portion 406 are shown, according to exemplary embodiments. Although reference is made here to mounting the second gear 442 on the upper portion 406, any of the mount varieties may also be used to mount the first gear 440 on the lower portion 402 if desired. A bend shaft may include one or more of the mount varieties.

FIG. 6A shows a side view of the bend shaft 400 with ledges 600 protruding from the upper portion 406, according to an exemplary embodiment. FIG. 6B shows a top view of the bend shaft 400 with ledges 600 protruding from the upper portion 406, according to an exemplary embodiment. Ledges 600 may be boxy as shown or may be somewhat rounded on any or all sides. Ledges 600 may protrude from the upper portion 406 orthogonal to the upper portion 406 and parallel to the crosspiece 404. Ledges 600 may be positioned anywhere along the upper portion 406 between the connected end 430 (i.e., above the crosspiece 404) and the free end 432.

Ledges 600 may comprise a first ledge 602 and a second ledge 604. The first ledge 602 may protrude from the upper portion 406 such that it is aligned with the crosspiece 404 and positioned above the crosspiece 404. The second ledge may protrude from an opposite side of the upper portion 406, also aligned with the crosspiece 404. Ledges 600 may be formed along with the rest of the bend shaft 400 in a stamping process, or may be manufactured using some other process.

Ledges 600 are thereby configured to support a gear when the upper portion 406 passes through an axial channel of the gear, such as axial channel 456 of second gear 442. Ledges 600 protrude at least far enough from the upper portion 406 so as to not pass through the axial channel of the gear. Gravity holds the gear down against the ledges 600.

Referring now to FIGS. 7A and 7B, a side view and top view of the bend shaft 400 with a ring 700 are shown, according to an exemplary embodiment. Ring 700 is configured to fit snuggly around the cylindrical upper portion 406, as ring 700 has an inner radius 702 roughly equal to an outer radius of the upper portion 406. The ring 700 may also be defined by an outer radius 704, with a flat top side 706 extending from the inner radius to the outer radius. Flat top side 706 may be substantially orthogonal to the upper portion 406, and may be parallel to the crosspiece 404. The ring 700 may be positioned anywhere along the upper portion 406 between the connected end 430 (i.e., above the crosspiece 404) and the free end 432.

Ring 700 may be installed on the bend shaft 400 using an over-molding process, in which the bend shaft 400 is placed in a mold and over-molding material such as a polymer is added and cured to form the ring 700. In other embodiments, the ring 700 may be manufactured separately and coupled to the bend shaft 400.

Ring 700 is thereby configured to support a gear when the upper portion 406 passes through an axial channel of the gear, such as axial channel 456 of second gear 442. Outer radius 704 is sufficient to ensure that the gear rests on the top side 706 and that the ring 700 does not pass through the axial channel. In other words, the outer radius 704 is larger than the radius of the relevant axial channel. Gravity holds the gear down against the ring 700.

Referring now to FIGS. 8A and 8B, a side view and a top view of the bend shaft 400 with a slot 800 and a clip 802 are shown, according to an exemplary embodiment. Slot 800 may be a depression into the upper portion 406. Upper portion 406 is a cylinder with a circumference, and the slot 800 is a reduction in the circumference of the upper portion 406 for a slot section 806 of the upper portion 406. In other embodiments, the slot 800 may be a hole through the upper portion 406 or one or more straight channels along a side or sides of upper portion 406, or some combination thereof. The slot 800 may be positioned anywhere along the upper portion 406 between the connected end 430 (i.e., above the crosspiece 404) and the free end 432.

The slot 800 may be configured to receive a clip 802. The clip 802 fits into the slot 800, and may rest against a bottom surface 808 of the slot 800. The clip 802 may contain a retaining feature to secure the clip 802 in the slot 800. When received by the slot, the clip 802 may protrude from the upper portion 406. The clip 802 may thereby be positioned to support a gear when the upper portion 406 passes through an axial channel of the gear, such as axial channel 456 of second gear 442. In some embodiments, the upper portion 406 includes multiple slots 800 that may be selected by moving the clip 802 to adjust the position of the gear. The clip 802 protrudes far enough from the upper portion 406 to ensure that the gear rests on the clip 802 and that the clip 802 does not pass through the axial channel. Gravity holds the gear down against the clip 802.

Referring now to FIGS. 9A and 9B, a cross-section side view and a top view of the bend shaft 400 with flaring 900 are shown, according to an exemplary embodiment. In some embodiments the bend shaft 400 is solid. In other embodiments, for example as shown in FIGS. 9A-9B, the bend shaft 400 has a hollow core 902 defined by a shaft wall 904.

The shaft wall 904 may include flaring 900 along the upper portion 406 of the bend shaft 400. As opposed to a separate protrusion or ring installed on the upper portion 406 (as in FIGS. 6A-7B), the flaring 900 is a formed by folds or curves in the shaft wall 904 itself. Shaft wall 904 extends away from the connected end 430 of the upper portion 406 in a substantially cylindrical form. At the flaring 900, the shaft wall 904 juts out to form a bottom 908 of the flaring 900, curves to form an outside edge 910 of the flaring 900, and then cuts back in to form a top 912 of the flaring 900. The bottom 908 and the top 912 may also be separated by hollow core 902. The shaft wall 904 extends from the flaring 900 to the free end 432 of the upper portion 406 in a cylindrical form substantially similar to the form of the shaft wall 904 between the flaring 900 and the connected end 430. The bottom 908 and top 912 of the flaring 900 may flare out from the upper portion 406 by substantially the same magnitude in all directions from the upper portion 406, such that the flaring 900 is ring-shaped when seen from a top view as in FIG. 9B. Flaring 900 may be positioned anywhere along the upper portion 406 between the connected end 430 (i.e., above the crosspiece 404) and the free end 432.

Flaring 900 may thereby be configured to support a gear when the upper portion 406 passes through an axial channel of the gear, such as axial channel 456 of second gear 442. More particularly, the gear can rest on top 912 of the flaring 900. Flaring 900 flares out from the upper portion 406 at least far enough so that the flaring 900 cannot pass through the axial channel 456. Gravity holds the gear down against the flaring 900.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. An actuator comprising:
    a housing;
    a gear train contained within the housing and coupled to a movable component outside the housing for driving the movable component between multiple positions, the gear train comprising a plurality of gears including a first gear and a second gear;
    a bend shaft fixed to an internal surface of the housing and configured to support the first gear and the second gear, the bend shaft comprising:
        a lower portion comprising a first end coupled to the housing and a second end offset from the first end, the lower portion extending from the first end to the second end along a first direction;
        a crosspiece oriented orthogonal to the first direction and extending from the second end of the lower portion; and
        an upper portion comprising a third end coupled to the crosspiece and a fourth end offset from the third end, the upper portion extending from the third end to the fourth end along the first direction.

2. The actuator of claim 1, wherein the first gear is positioned on the lower portion and the second gear is positioned on the upper portion.

3. The actuator of claim 2, wherein the first gear and the second gear each have an open axial channel, and wherein the lower portion passes through the open axial channel of the first gear and the upper portion passes through the open axial channel of the second gear.

4. The actuator of claim 3, wherein the first gear is rotatable around a first axis, the second gear is rotatable around a second axis, and the first axis is offset from the second axis by a length of the crosspiece.

5. The actuator of claim 4, further comprising a third gear rotatable around a third axis and positioned between the second gear and the housing, wherein the third axis is offset from the second axis and the second axis passes through the third gear.

6. The actuator of claim 4, wherein the lower portion, the crosspiece, and the upper portion are each substantially cylindrical.

7. The actuator of claim 6, wherein the upper portion comprises a gear support that supports the second gear, the gear support comprising a circular slot depressed into the upper portion around a circumference of the upper portion and configured to receive a circular clip.

8. The actuator of claim 6, wherein the upper portion comprises a gear support that supports the second gear, the gear support comprising a ring around the upper portion.

9. The actuator of claim 6, wherein the upper portion comprises a gear support that supports the second gear, the gear support comprising a pair of ledges protruding from the upper portion.

10. The actuator of claim 6, wherein the upper portion comprises a gear support that supports the second gear, the gear support comprising a flaring of a wall of the upper portion.

11. The actuator of claim 6, wherein the lower portion, the crosspiece, and the upper portion are formed as one continuous member.

12. The actuator of claim 6, further comprising a cuff coupled to the housing and configured to receive the first end of the lower portion.

13. The actuator of claim 12, wherein the cuff is further configured to prevent the bend shaft from rotating relative to the housing.

14. A method of arranging gears in an actuator, comprising:
    providing a bend shaft having a lower portion, a crosspiece, and an upper portion; and
    placing a first gear on the lower portion and a second gear on the upper portion;
        wherein the lower portion comprises a first end coupled to a housing and a second end offset from the first end and extends from the first end to the second end along a first direction;
        the bend shaft is non-rotatably fixed relative to the housing;
        the crosspiece is oriented orthogonal to the first direction and extends from the second end of the lower portion; and
        the upper portion comprises a third end coupled to the crosspiece and a fourth end offset from the third end, the upper portion extending from the third end to the fourth end along the first direction.

15. The method of claim 14, further comprising supporting the second gear on the upper portion by:
    inserting a clip into a slot depressed into the upper portion around a circumference of the upper portion; and
    setting the second gear on the clip.

16. The method of claim 14, further comprising supporting the second gear on the upper portion by setting the second gear on at least one of a ring, a pair of ledges, and a flaring.

17. The method of claim 14, wherein placing the first gear on the lower portion and the second gear on the upper portion comprises:
    inserting the lower portion through an axial channel of the first gear; and
    inserting the upper portion through an axial channel of the second gear.

18. The method of claim 17, further comprising providing a third gear on a second shaft, the third gear at least partially positioned between the upper portion and the housing.

19. A bend shaft contained within a housing of an actuator and configured to support a gear train comprising a plurality of gears, wherein the bend shaft is non-rotatably fixed to the housing, the bend shaft comprising:
    a lower portion comprising a first end coupled to the housing and a second end offset from the first end, the lower portion extending from the first end to the second end along a first direction;
    a crosspiece oriented orthogonal to the first direction and extending from the second end of the lower portion; and
    an upper portion comprising a third end coupled to the crosspiece and a fourth end offset from the third end, the upper portion extending from the third end to the fourth end along the first direction.

20. The bend shaft of claim 19, wherein the lower portion includes a first gear of the plurality of gears rotatable around a first axis, the upper portion includes a second gear of the plurality of gears rotatable around a second axis, and the second axis intersects the first gear.

\* \* \* \* \*